Aug. 11, 1931.                A. W. MINER                1,818,266
                               BOX COVER
                           Filed Nov. 19, 1928          3 Sheets-Sheet 1
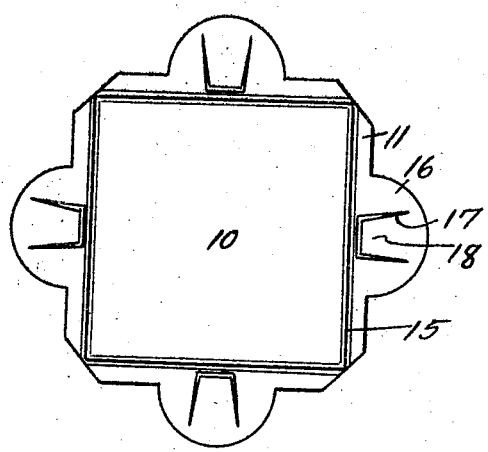
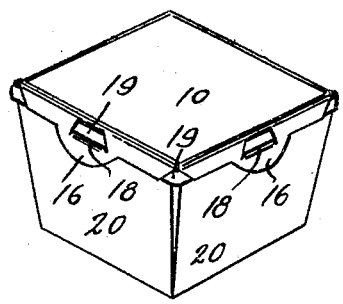
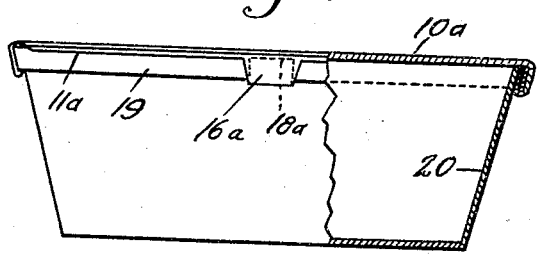
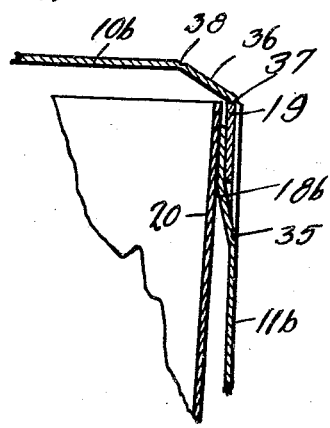
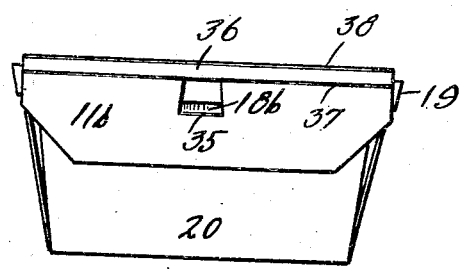
Inventor
Arlow W. Miner
By Lynn H. Latta
Attorney Aug. 11, 1931.  A. W. MINER  1,818,266
BOX COVER
Filed Nov. 19, 1928   3 Sheets-Sheet 2

Inventor
Arlow W. Miner
By Lynn H. Latta
Attorney

Aug. 11, 1931.  A. W. MINER  1,818,266
BOX COVER
Filed Nov. 19, 1928  3 Sheets-Sheet 3

Inventor
Arlow W. Miner
By Lynn H. Latta
Attorney

Patented Aug. 11, 1931

1,818,266

UNITED STATES PATENT OFFICE

ARLOW W. MINER, OF SIOUX CITY, IOWA

BOX COVER

Application filed November 19, 1928. Serial No. 320,328.

My invention relates to boxes or small baskets of the type used for fruits, vegetables, and the like, by retail grocers or packers, and has for its object to provide a cover which can be quickly attached to such a box or basket and secured so as to eliminate the necessity for wrapping or tying the box or basket.

More particularly, it is my purpose to provide a cover which may be constructed of stiff paper or the like and which is provided with means for securing it in place on a box or basket.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Fig. 1 is a plan view of one form of my invention.

Fig. 2 is a perspective view of the same attached to a fruit box.

Fig. 3 is a side elevation, partly in section, of a fruit box or basket with a modified form of my invention attached thereto.

Fig. 4 is a side elevation of a further modified form of my invention.

Fig. 5 is a vertical, central, sectional view taken through the form shown in Fig. 4.

Figure 6:
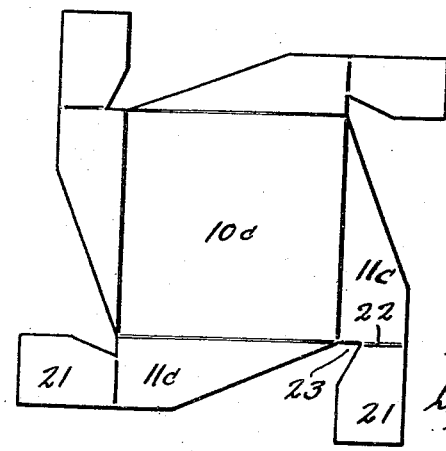
Fig. 6 is a plan view of a further modified form of my invention.

At the present time when a box of berries or other fruit is purchased at a grocery store, it is necessary for the grocer to wrap the box with wrapping paper and tie it in order to protect the berries and retain them within the box during transportation.

Such a process is rather involved and consumes a considerable amount of the clerk's time. A considerable amount of wrapping paper is necessary to completely wrap a box of berries.

It has occurred to me that if the grocer had available a cover of stiff paper or the like which could be quickly attached to the box that a great saving would result.

My invention contemplates providing such a cover made of stiff paper or the like so as to be very inexpensive and so constructed as to be readily attachable to the box to cover the open top and secured firmly enough to insure against becoming loosened.

There are two problems involved in attaching such a cover to a fruit box or basket. In the first place, it is necessary to secure the cover against lateral sliding movement relative to the box or basket and in the second place, it is essential to secure it against being lifted from the box or basket.

In each form of my invention, the cover comprises a sheet of paper or wood having a central portion which is shaped to conform generally to the shape of the top of a box or basket. Since most boxes and baskets of this nature are either square or rectangular in shape, the cover will in most cases be either square or rectangular. For convenience in illustration, only the square types will be shown, although it will be understood that identically the same principles of construction may be applied to rectangular covers in all cases and that in some of the forms of my invention, the identical principles of construction may be applied to covers having two parallel sides and rounded ends applicable to such baskets as those that have rounded ends.

In the form of my invention shown in Fig. 1, the central sheet is indicated by the reference character 10. In the form shown in Fig. 3, it is indicated by the reference character 10a; in the form shown in Fig. 4, by the reference character 10b; in the form shown in Fig. 6, by the reference character 10c; in the form shown in Fig. 8, by the reference character 10g; in the form shown in Fig. 9, by the reference character 10h.

Figure 11:
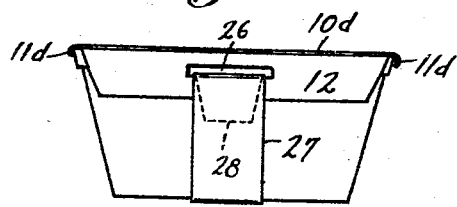
Fig. 11 is a side elevation of a box with a further modified form of my invention attached thereto.
Figure 12:
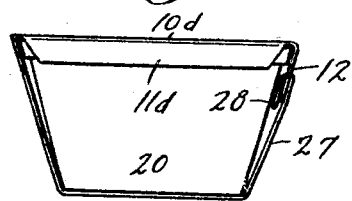
Fig. 12 is an end elevation of the same.
Figure 13:
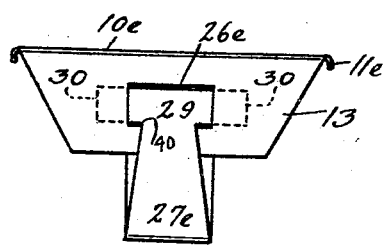
Fig. 13 is a side elevation of a further modified form of my invention.
Figure 14:
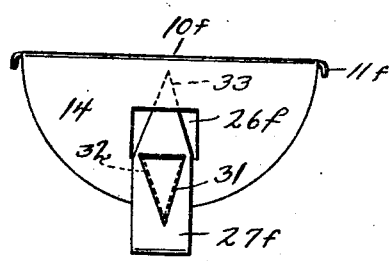
Fig. 14 is a still further modified form of my invention.

In the form of my invention shown in Fig. 11, the central sheet is indicated by the reference character 10d, the form shown in Fig. 13, by the reference character 10e, and in the form shown in Fig. 14, by the reference character 10f.

In each form of the invention, the sides of the central portion 10—10h, respectively, are adapted to be folded downwardly to form flanges. These flanges will embrace the upper extremities of the box or basket in such a way as to prevent lateral movement of the cover relative to the box or basket. In the form shown in Fig. 1, the flanges are indicated by the reference character 11. In the form shown in Fig. 3, they are indicated by the reference character 11a, in the form shown in Fig. 4, by the reference character 11b, in the form shown in Fig. 6, by the reference character 11c, in the form shown in Fig. 8, by the reference character 11g, in the form shown in Fig. 9, by the reference character 11h, in the form shown in Fig. 11, by the reference character 11d, in the form shown in Fig. 13, by the reference character 11e, and in the form shown in Fig. 14 by the reference character 11f.

It may be noted in reference to the forms shown in Figs. 11 and 13 and 14 that the flanges on two sides of the cover are of much greater depth than the other flanges. These deeper flanges are indicated by the reference characters 12, 13 and 14, respectively, and will be more specifically described in detail hereinafter.

In each case, the flanges are set off from the central sheet of the cover by scoring as at 15 in Fig. 1 and Fig. 6. The scoring makes it easy to bend the flanges along the proper lines and after the flanges are bent, the cover will be the proper shape and size to fit the box for which it is intended. The scoring also makes it possible for the grocer's clerk to bend the flanges in a short space of time. In this connection, it may be stated that the covers are shaped flat, thereby making it possible to pack a large number of the covers in a very compact package.

It is necessary to provide means for preventing lifting of the cover from the box or basket and my invention contemplates combining this securing means with the flanges in such a way that the securing means will hold the flanges in their downwardly folded positions. In order that the flanges may be readily folded, the corners of the flanges are cut away. In other words, the flanges terminate in each case at the inner section of the scoring marks 15 or in the lines of fold. By so terminating the flanges in the lines of fold at each end, it is very easy to fold the flanges properly. I do not rely upon the securing devices to hold the flanges in their downwardly folded positions.

In the form shown in Fig. 1, the securing device comprises a plurality of tabs 16, each provided with a U shaped cut 17, forming a tongue 18. The tongues 18 are inserted under the reinforcing bands 19, which are found in a large number of box and basket constructions. It will be understood that there is ordinarily sufficient space between the band 19 and the side 20 of the box or basket so that the tongues 18 may be inserted between the band and side.

In placing the cover shown in Fig. 1 on a box, the clerk lays the flat cover over the box and with his hands presses the flanges 11 and tabs 16 downwardly. Holding the box with his left hand, he then pulls outwardly on one of the tabs until the tongue 18 has slipped under the edge of the band 19. The index finger of the right hand may be used to guide the tongue 18 into place and by pressing back toward the side of the box with the thumb against the tab 16, the tongue 18 will be forced upwardly between the band and the side of the box.

It will be understood that the operation just described may be performed very rapidly and due to the stiffness of the paper, the tongues will slip into place very easily. Once they are in place with all four flanges held downwardly by their respective tabs, the cover will be very securely held in place upon the box. Any tendency to lift upwardly on the cover will only wedge the tongues more tightly between the band 19 and the side of the box.

In removing the cover, it may be destroyed if that is the most convenient way to remove it. However, it is possible to withdraw the tongues 18 by pulling outwardly on the tabs 16 and the cover may be used a second time after a portion of the contents have been taken from the box.

It will now be seen that the securing tabs serve to hold the flanges 11 in their bent positions, embracing the sides of the box and also to prevent lifting of the cover from the box. In the form shown in Fig. 3, the securing devices are very similar to those shown in Fig. 1 embodying tabs 16a and tongues 18a. However, the tongues 18a in this instance, instead of being formed by slitting out the central portions of the tabs are formed by bending up the ends of the tabs 16a. The tabs 16a will therefore be scored with lines parallel to the lines which define the flanges 11a, positioned at the proper distance to make the tabs 16a the proper length. In inserting the tongues 18a, the process is very similar to that used with the form shown in Fig. 1. The end of the tongue 18a is sprung under the band 19 by pulling outwardly on the tabs 16a and then is pushed upwardly between the band 19 and the side 20 of the box by pushing inwardly upon the tab 16a.

It will be understood that wood in thin sheet form may be used instead of paper as material for the covers. In Figs. 4 and 5, I have shown a form which is especially adapted to be constructed from wood. It is substantially similar to the cover shown in Figs. 1 and 2 comprising flanges 11b and tongues 18b but the tongue 18b is partially severed at its base from the material of the flange 11b by a wedge-shaped cut 35, allowing the tongue to be bent much more easily without breaking. The grain of the wood extends longitudinally of the tongue.

In order to give sufficient flexibility to allow the flange to be drawn downwardly preparatory to starting the tongue 18b under the band 19, I provide a corner member 36, which is separated from the flange 11b and the central sheet 10b by means of cuts 37 and 38 similar to the cut 35. As the flange 11b is pulled downwardly, the portion 36 will slide around the corner of the band 19, compressing the side of the box inwardly and when the tongue 18b is moved upwardly behind the band 19, the portion 36 will return to a position above the box.

In the form shown in Fig. 6, the securing device comprises a tongue 21, which is formed at the end of the flange 11c and separated therefrom by a score line 22, which is aligned with the score line 15b. The tongue 21 is cut away as at 23 to accommodate the band 19. The tongue is inserted through the space which is formed between the adjacent edges of the sides of the boxes or baskets of the type of construction employing the band 19. The tongue rests against the inner side of the wall 20 of the box or basket on the inside of the box and is held between the fruit and the side of the box.

It is noted that what is the upper edge of the tongue when in its folded position is substantially aligned with the upper extremity of the flange 11c so that when the tongue is inserted into the box, this upper edge will substantially engage the under surface of the center portion 10c of the cover. It may be noted that in this form as with the two preceding forms, the tongue is held in place under the band 19 and in turn serves to hold the flange 11b in its downwardly bent position.

Figure 8:
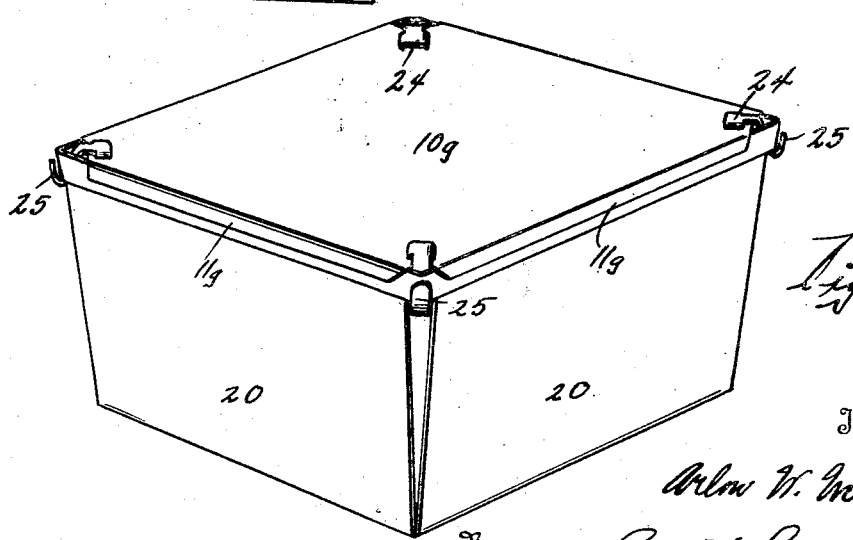
Fig. 8 is a perspective view of a further modified form of my invention attached to a box or basket.

In the form shown in Fig. 8, the tongue, instead of being formed integrally, is made of metal secured as at 24 to the corners of the central portion 10g. The tongue is indicated by the reference character 25 and is bent under the band 19. In this form, as in all of the preceding forms, the tongue is secured to the box by being bent under the band 19. However, the tongue does not in this case secure the flanges 11g in their downwardly bent position.

In this form of the invention, the tongues 25 may be inserted either as shown in the drawings or may be inserted from the outside and brought over the band 19 downwardly around the outside of the band and thence bent inwardly underneath the band.

Figure 7:
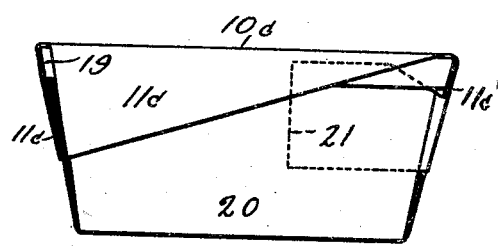
Fig. 7 is a side elevation of a box or basket to which the cover shown in Fig. 6 is attached.
Figure 9:
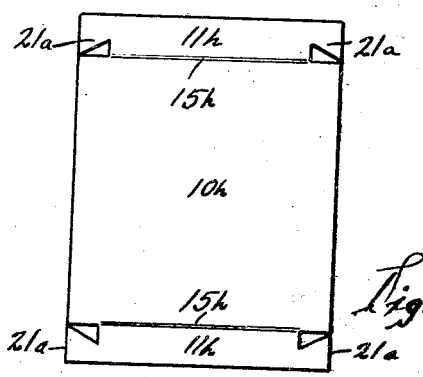
Fig. 9 is a plan view of a further modified form of my invention.
Figure 10:
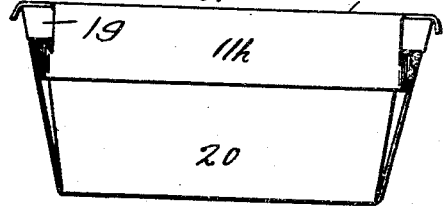
Fig. 10 is a side elevation of the box with the same form attached.

In the form shown in Fig. 9, the flanges 11h are provided at each end with a securing tongue 21a, which are pointed and adapted to be extended through the openings in the corners of the box and under the band 19, although not as far inwardly as the tongues 21. This form of the invention is very similar to that shown in Figs. 6 and 7 and is particularly adaptable to being constructed in wood.

The grain of the wood in this form of the invention extends transversely of the score lines 15h, shown in Fig. 9. These score lines are made as wedge shaped cuts in the wood construction. It will be understood that this form of the invention may be as well constructed on paper as in wood. In this form of the invention, the securing devices serve to hold the flanges in their downwardly bent position relative to the box and to secure the cover tightly against the box.

In the form shown in Fig. 11, the band 19 is not utilized for securing the cover to the box. This form and the succeeding forms of the invention are therefore particularly adaptable to those types of boxes which do not have the rim band 19. The flange 12 is made wide enough to accommodate a slot 26 and the flange on the opposite side of the box is continued to form a strap 27, having at its end a tongue 28, adapted to be passed through the slot 26 and bent back and to be bent back upon itself between the flange 12 and the side of the box. In inserting the tongue 28, the strap is pulled tightly around the box and the end of the strap pulled away from the side of the box sufficiently to allow the end of the tongue to enter the slot 26. By then pressing the strap back against the side of the box, the tongue will be forced down between the flange 12 and the side of the box. In common with those forms of the invention shown in Figs. 1-10, inclusive, this form of the invention relies on some of the flanges being held down in their bent position, embracing the sides of the box by means of the securing device.

However, the two flanges 11d in this form of the invention are not so held down. This form of the invention may be used either with or without the flanges 11b, the friction of the band and the cover against the parts of the box which they engage ordinarily being sufficient to prevent lateral movement of the cover relative to the box.

In the form of my invention shown in Fig. 13, I employ the same general construction as that shown in Fig. 11. The band which encircles the box is here indicated by the reference character 27e. An opening 26e is provided, which receives the T-shaped head 29 of the band 27e. The head 29 is inserted in the opening 26e by bending the tongues 30, which form the head, toward each other until their ends are sufficiently close together to be received within the opening. In so doing, the central portion of the head 29 will be forced away from the box. After insertion of the ends of the tongues 30 in the opening, the thumb may be inserted, the central portion forcing the tongues 30 to spread out between the flange 13e and the side of the box. The band 27e, when it pulls the head downwardly, will cause the notches 40 to receive the flap 13 at the lower extremity of the opening 26e, thus further locking the head against removal.

In this form of the invention, the securing device serves to hold some of the flanges in their downwardly bent position.

In the form of my invention shown in Fig. 14, the same general construction is employed as that just described for Figs. 11 and 13. One of the flanges 14 is provided with an extension to form a band 27f and the other flange 14, provided with an opening 26f. The band 27f is provided in a region spaced from its end with a V-shaped or U-shaped slit 31, which forms an integral tongue 32.

The end of the bands 27f which is extended beyond the slit 31 as at 33 forms another tongue and the two tongues are inserted within the opening 26f, the tongue 32 being first inserted and the tongue 33 last. The tongue 33 might be eliminated, leaving only the tongue 32, which, being secured between the flange 14 and the side of the box, is securely held against removal irrespective of the tongue 33. The tongue 33, however, increases the security with which the strap is held by the securing device.

The flanges also serve to prevent the contents of the box or basket being spilled.

The covers shown in Figs. 11–14 inclusive may be made double width and provided with two tongues so as to engage simultaneously two boxes which are placed side by side. Such a cover will then serve not only to cover the two boxes but also to secure them together.

Some changes may be made in the construction and arrangement of the parts of my invention without departing from the real spirit and purpose of my invention, and it is my intention to cover by my claims, any modified forms of structure or use of mechanical equivalents, which may be reasonably included within their scope.

I claim as my invention:

1. In a box cover of paper or the like, for a box having a top reinforcing band, a central sheet provided with opposed tabs, adapted to be bent at substantially right angles to the central sheet and tongues formed integrally with the tabs and adapted to be received under said reinforcing band at opposed points of the box to retain the cover in place, said tongues being struck from the material of the tabs, and arranged with their free ends extending upwardly.

2. In a box cover of paper or the like, for a box having a top reinforcing band, a central sheet provided with two pairs of opposed tabs, adapted to be bent at substantially right angles to the central sheet and tongues formed integrally with the tabs and adapted to be received under said reinforcing band at opposed points of the box to retain the cover in place, said tongues being struck from the material of the tabs, and arranged with their free ends extending upwardly.

Signed this 17 day of November, 1928, in the county of Woodbury and State of Iowa.

ARLOW W. MINER.